(12) United States Patent
Boisson et al.

(10) Patent No.: US 12,252,077 B2
(45) Date of Patent: Mar. 18, 2025

(54) MOTOR VEHICLE BODYWORK PANEL COMPRISING A TRANSPARENT PORTION

(71) Applicant: COMPAGNIE PLASTIC OMNIUM SE, Lyons (FR)

(72) Inventors: Damien Boisson, Sainte-Julie (FR); Aurélie Bergeron-Vanhille, Sainte-Julie (FR); Laura Moisan, Sainte-Julie (FR); Elise Dubost, Sainte-Julie (FR); Pallas Leroy, Sainte-Julie (FR)

(73) Assignee: COMPAGNIE PLASTIC OMNIUM SE, Lyons (FR)

( * ) Notice: Subject to any disclaimer, the term of this patent is extended or adjusted under 35 U.S.C. 154(b) by 110 days.

(21) Appl. No.: 17/757,046

(22) PCT Filed: Dec. 8, 2020

(86) PCT No.: PCT/EP2020/084988
§ 371 (c)(1),
(2) Date: Jun. 8, 2022

(87) PCT Pub. No.: WO2021/116061
PCT Pub. Date: Jun. 17, 2021

(65) Prior Publication Data
US 2023/0001864 A1 Jan. 5, 2023

(30) Foreign Application Priority Data

Dec. 9, 2019 (FR) ....................................... 1913985

(51) Int. Cl.
*B60R 13/04* (2006.01)
(52) U.S. Cl.
CPC ................... *B60R 13/04* (2013.01)

(58) Field of Classification Search
None
See application file for complete search history.

(56) References Cited

U.S. PATENT DOCUMENTS

| | | | |
|---|---|---|---|
| 2004/0021961 A1* | 2/2004 | Munro | B60R 13/04 359/843 |
| 2009/0080208 A1* | 3/2009 | Droste | G02B 6/001 362/509 |

(Continued)

FOREIGN PATENT DOCUMENTS

| | | |
|---|---|---|
| DE | 102009017363 A1 | 10/2010 |
| DE | 102011112835 A1 | 3/2013 |

(Continued)

OTHER PUBLICATIONS

International Search Report and Written Opinion of International Searching Authority for PCT/EP2020/084988, ISA/NL, Rijswijk, Netherlands, Dated: Jan. 12, 2021.

*Primary Examiner* — Elizabeth Collister
(74) *Attorney, Agent, or Firm* — M&B IP Analysts, LLC

(57) ABSTRACT

The present disclosure concerns a motor vehicle bodywork panel, including: a main body, a wall made of a plastic material that is transparent to a visible light, comprising a face visible from an outside of a vehicle, and a coating that is transparent to visible light, wherein the coating covers at least the face visible from the outside of the vehicle of the wall that is transparent to the visible light and visible from the outside of the vehicle, wherein the wall is encapsulated in a sealed manner between the main body and the coating that is transparent to the visible light.

17 Claims, 1 Drawing Sheet

(56) References Cited

U.S. PATENT DOCUMENTS

| | | |
|---|---|---|
| 2012/0032592 A1 | 2/2012 | Breunig et al. |
| 2017/0139506 A1* | 5/2017 | Rodríguez ............. G06F 3/041 |
| 2017/0352938 A1* | 12/2017 | Okumura ............... H01Q 1/425 |
| 2018/0029264 A1* | 2/2018 | Sharron ............. B29C 45/1671 |

FOREIGN PATENT DOCUMENTS

| | | | |
|---|---|---|---|
| EP | 1344688 A2 | 9/2003 | |
| EP | 1650053 A1 | 4/2006 | |
| EP | 1707988 A1 | 10/2006 | |
| FR | 3004399 A1 | 10/2014 | |
| FR | 3074129 A1 | 5/2019 | |
| WO | 2019043202 A1 | 3/2019 | |
| WO | WO-2020083749 A1 * | 4/2020 | ............. B29C 45/16 |

* cited by examiner

[Fig. 1]
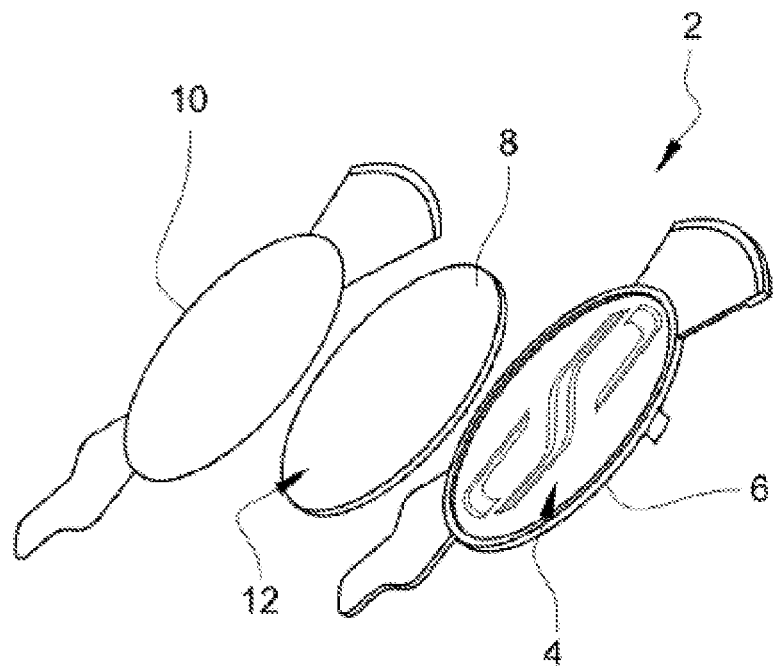
[Fig. 2]
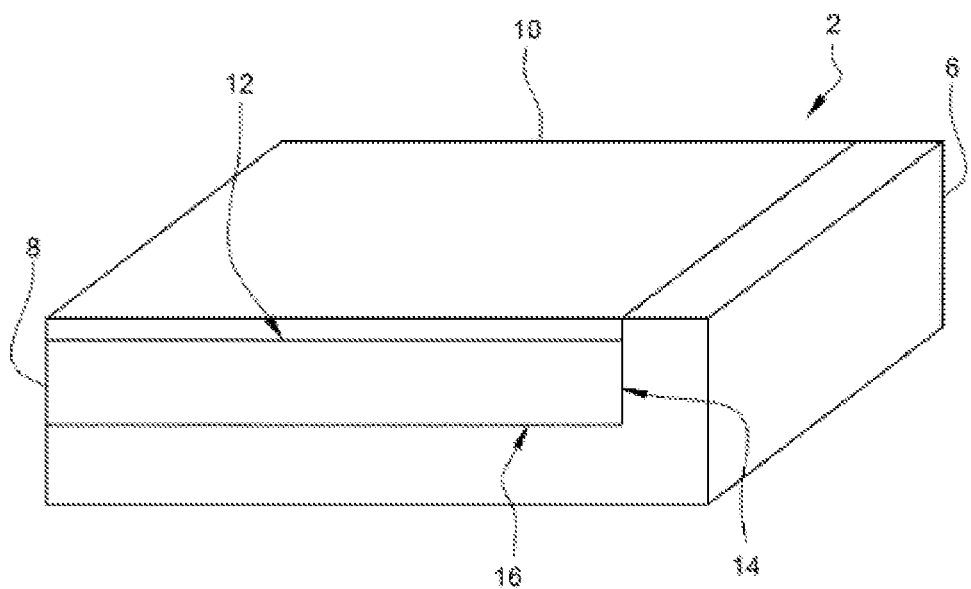

MOTOR VEHICLE BODYWORK PANEL COMPRISING A TRANSPARENT PORTION

The present disclosure relates to motor vehicle bodywork panels, and more particularly to bumper skins.

The bodywork panels may comprise a transparent portion that is visible from outside the vehicle on which the panels are mounted. For example, a bumper skin can comprise, at an area comprising a vehicle emblem, a portion comprising a wall that is transparent to visible light. It could also be an area of a bodywork panel forming a radome. The term "transparent to visible light" means that it is at least transparent to any light radiation having a wavelength comprised in the visible spectrum, that is to say, comprised between about 380 and 780 nm. Using a transparent wall for example allows a good quality visual rendering to be obtained.

However, the transparent wall, which is visible from outside the vehicle, can be exposed to climatic conditions and deteriorate, which poses a substantial problem for a part intended at least in part for esthetics. For example, certain available thermoplastic materials turn yellow by thermal oxidation, that is to say, in contact with oxygen and in the presence of heat, for example that of the sun. This is particularly the case for certain polyamides and polyvinyl chloride. It is then necessary to use special plastic materials that are not subject to this phenomenon, which reduces the choice of materials and can generate additional production costs for the bodywork panels by having to design a transparent wall with a plastic material having a particular formulation.

These degradations lead not only to a potential loss of the desired esthetic rendering, but can also give the bodywork panel an appearance that is not acceptable in the long term.

The object of the present disclosure is in particular to provide a bodywork panel of the type mentioned above having an optimal and durable esthetic result during the lifetime of the vehicle on which it is mounted.

To this end, the subject of the present disclosure is a motor vehicle bodywork panel comprising:
- a main body,
- a wall made of plastic material that is transparent to visible light, comprising a face intended to be visible from outside the vehicle, and
- a coating that is transparent to visible light covering at least the face of the wall that is transparent to visible light intended to be visible from the outside of the vehicle, the wall being encapsulated in a sealed manner between the main body and the coating.

Thus, a motor vehicle bodywork panel is obtained comprising an outer wall that is transparent to visible light which is not in contact with oxygen, which prevents thermal oxidation leading to the yellowing of certain plastic materials. This allows the esthetics of the bodywork panel to be preserved, regardless of the plastic material used to form the wall transparent to visible light (it is therefore possible to use plastic materials that are frequently used to design bodywork panels without having to modify their formulation, in particular polyamides). The presence of an external coating makes it possible to protect the transparent wall from scratches and ultraviolet rays, but also to integrate, for example, a decorative film or even defrosting wires. This can make it possible to protect the transparent wall (protection against scratches and ultraviolet rays), to change the esthetic rendering of the bodywork panel (integration of a decorative film) or even to integrate options on the vehicle (presence of defrosting wires).

The bodywork panel according to the present disclosure may further comprise at least one of the following features:
- the wall transparent to visible light is made of polyamide and the coating transparent to visible light is a film made of polyurethane,
- the thickness of the coating transparent to visible light is between 0.5 millimeters and 3 millimeters,
- at least one decorative element is positioned between the wall transparent to visible light and the main body or between the wall transparent to visible light and the coating transparent to visible light,
- at least one means for defrosting the bodywork panel is positioned between the wall transparent to visible light and the main body or between the wall transparent to visible light and the coating transparent to visible light,
- at least one visible light emitting device is positioned between the wall transparent to visible light and the main body or between the wall transparent to visible light and the coating transparent to visible light,
- the main body covers all the faces of the wall transparent to visible light with the exception of the face covered by the coating transparent to visible light,
- bodywork panel forms a bumper skin, and
- the bodywork panel forms at least a part of a radome.

The present disclosure also relates to a method for manufacturing a motor vehicle bodywork panel in which a wall made of plastic material transparent to visible light is encapsulated in a sealed manner between a coating transparent to visible light and a bodywork panel main body.

Thus, a bodywork panel is obtained whereof a portion potentially sensitive to degradation, for example by thermal oxidation, is protected therefrom.

The method according to the present disclosure may also comprise at least one of the following features:
- the manufacturing method comprises the following steps:
  - the coating transparent to visible light is applied in a mold, preferably by spraying,
  - the wall transparent to visible light is molded on the coating, and
  - the wall transparent to visible light is encapsulated in a sealed manner between the coating transparent to visible light and the main body of the bodywork panel,
- the manufacturing method comprises the following steps:
  - the wall transparent to visible light is molded,
  - the coating transparent to visible light is overmolded on at least one face of the wall transparent to visible light intended to be visible from outside a vehicle, and
  - the wall transparent to visible light is encapsulated in a sealed manner between the coating transparent to visible light and the main body of the bodywork panel,
- at least one decorative element, at least one bodywork panel defrosting means and/or at least one visible light emitting device is placed between the main body and the wall transparent to visible light,
- at least one decorative element, at least one means for defrosting the bodywork panel and/or at least one device for emitting visible light is placed between the coating transparent to visible light and the wall transparent to visible light, and
- the wall transparent to visible light is made of polyamide and the coating transparent to visible light is a film made of polyurethane, the thickness of which is preferably between 0.5 millimeters and 3 millimeters.

BRIEF DESCRIPTION OF THE FIGURES

The various disclosed embodiments will be better understood upon reading the description which follows, given solely by way of example and with reference to the appended drawings, in which:

FIG. 1 is a perspective view of a bodywork panel according to an embodiment, and FIG. 2 is a perspective view of a bodywork panel according to the embodiment.

DETAILED DESCRIPTION

Reference is now made to FIG. 1 illustrating an exploded view of a portion 2 of a bodywork panel according to an embodiment. It may for example be a bodywork panel of the bumper skin type, this portion 2 therefore being able to correspond to an area comprising an emblem of the motor vehicle. The presence may for example be noted of a decorative element 4 (which may have the form of a decorative leaf or even be painted). Of course, the portion 2 can also be put in place at a bodywork panel other than a bumper.

In what follows, we will describe the portion 2 of the bodywork panel. Of course, everything that is described for the portion 2 (component elements, manufacturing method) is also applicable to the bodywork panel as a whole.

The portion 2 of the bodywork panel comprises a main body 6. The latter can be made conventionally from a thermoplastic material of the type used to manufacture a bodywork panel from thermoplastic material. The main body can also, as shown in FIGS. 1 and 2, be opaque to visible light. The term "opaque to visible light" means that a material does not allow any light radiation having a wavelength comprised in the visible spectrum, that is to say, comprised between approximately 380 and 780 nm, to pass. The color of the main body 6 may vary.

The portion 2 also comprises a wall 8 made of plastic material transparent to visible light comprising a face 12 intended to be visible from outside the vehicle. This wall 8 is fixed on one face of the main body 6, more precisely the face visible from the outside of a motor vehicle on which the portion 2 is present.

The wall 8 can be made of polyamide or polyvinyl chloride. As explained above, these materials tend to degrade (yellowing) by thermal oxidation, i.e. in contact with oxygen (for example that of the ambient air) and in the presence of heat (for example that of the sun).

To avoid this, a coating 10 transparent to visible light (according to the definition given above) is placed against the wall 8 so as to cover covering at least the face 12 of the wall transparent to visible light that is intended to be visible from the exterior of the vehicle, the wall 8 being encapsulated in a sealed manner between the main body 6 and the coating 10 transparent to visible light.

In other words, the wall 8 cannot be in contact with oxygen. As a result, and even in the event of an increase in the temperature of the wall, no yellowing of the wall 8 is observed because no thermal oxidation can take place.

In the examples shown, the main body 6 and the coating 10 are dimensioned so as to encapsulate the wall 8 in a sealed manner between them. No other element is necessary to encapsulate the wall 8. It is observed for example in FIG. 2 that the face 12 of the wall 8 is covered by the coating 10, all of the other faces, including the face 16 and the face 14, being covered by the main body 6 (therefore covering all the faces of the wall 8 with the exception of the face 12 covered by the coating 10).

Alternatively, it would be possible to bring at least one other element to encapsulate the latter. For example, the main body 6 and the coating 10 could each cover one face of the wall, for example the opposite faces 12 and 16. The other faces (including the face 14) would therefore be covered by one or more other elements ensuring the sealing of the final structure.

The coating 10 can be made of a thermoplastic material. For example, it can be made of polyurethane. It is moreover advantageous to use a polyurethane coating 10 in combination with a polyamide wall 8 because of the good adhesion properties between the two materials. More particularly, and in particular in the case where the part is produced by an in-mold coating (IMC) method, a mixture of a resin and a polyurethane hardener is used.

In the case where a polyurethane coating 10 (which may have the form of a film) is used, it is advantageous for the thickness of the latter to be between 0.5 and 3 millimeters. Indeed, this thickness range is interesting because:

the coating 10 protects the wall 8 from ultraviolet radiation, the coating 10 protects the wall 8 from scratches. It is even possible to make scratches disappear by locally heating the coating 10, and a depth effect is obtained at the portion 2, in particular if the latter has esthetic aims.

As explained before, it is possible for a decorative element 4 to be placed between the main body 6 and the wall 8 at the wall 16. It could also be placed between the wall 8 and the coating 10 at the wall 12. Since the wall 8 and the coating 10 are transparent to visible light, the decorative element 4 is visible from the outside of a motor vehicle on which the portion 2 is placed (it should be noted here that, in the zones that do not comprise the decorative element 4, the main body 6 is visible due to the transparency to visible light of the wall 8 and the coating 10).

It is also possible to introduce at least one visible light emitting device between the main body 6 and the decorative element 4 (which here is opaque to visible light) to obtain backlighting of the zone. Such devices, for example LEDs or even light guides (for example optical fibers diffusing the light emitted by LEDs), are known to those skilled in the art.

In the same way, it is possible to place at least one bodywork panel defrosting means between the wall 8 and the main body 6 or between the wall 8 and the coating 10. This is all the more relevant if the zone is traversed by waves emitted by distance sensor-type wave emitting members in order to avoid disturbing wave propagation by a layer of frost. The defrosting means are chosen as a function of the wave emission device, for example metal wires for ACC-type radars capable of emitting between 75 and 81 GHz. Such means are known to those skilled in the art.

The disclosed embodiment also relates to a method of manufacturing a motor vehicle bodywork panel of the type of that of the embodiment.

According to this method, a wall (the wall 8) made of plastic material transparent to visible light is encapsulated in a sealed manner by molding between a coating (the coating 10) transparent to visible light and a main body (the main body 6) of the bodywork panel (or portion 2). Thus, the wall 8 cannot be in contact with the oxygen in the ambient air.

In the case of molding by an in-mold coating method, the molding temperature is approximately 90° C., and the molding pressure is approximately equal to 20 bars.

According to a first embodiment of the method, corresponding to an in-mold coating method:
- the coating 10 transparent to visible light is applied in a mold, preferably by spraying. Thus, the bottom of the mold cavity is lined with material intended to form the coating 10;
- the wall 8 transparent to visible light is molded on the coating, for example by injection in the context of the use of a thermoplastic material;
- the wall 8 transparent to visible light is encapsulated in a sealed manner between the coating 10 transparent to visible light and the main body 6 of the bodywork panel.

According to a second embodiment of the method, also corresponding to an in-mold coating method:
- the wall 8 transparent to visible light is molded, for example by injection molding in the context of the use of a thermoplastic material;
- the coating 10 transparent to visible light is overmolded on at least one face (for example the face 12) of the wall 8 transparent to visible light intended to be visible from outside a vehicle, and
- the wall 8 transparent to visible light is encapsulated in a sealed manner between the coating 10 transparent to visible light and the main body 6 of the bodywork panel.

As regards the encapsulation of the wall 8, this can be done by overmolding the main body 6 on the wall 8/coating 10 assembly or by attaching the main body 6 molded beforehand onto this assembly.

Advantageously, it is possible to place at least one decorative element, at least one means for defrosting the bodywork panel and/or at least one device for emitting visible light between the main body 6 and the wall 8 transparent to visible light. These elements will make it possible to obtain the effects described above.

Alternatively, these elements can be placed between the coating 10 transparent to visible light and the wall 8 transparent to visible light.

The different placements mentioned take place before the step aimed at linking the two parts between which they are arranged. For example, and in the event a decorative element 4 is placed between the main body 6 and the wall 8, this decorative element 4 is placed before encapsulating the main body 6 on the wall 8/coating 10 assembly.

The present disclosure is not limited to the embodiments described here, and other embodiments will become clearly apparent to a person skilled in the art. It is in particular possible to vary the structure of the bodywork panel with respect to what is shown in FIGS. 1 and 2.

The invention claimed is:

1. A motor vehicle bodywork panel, characterized in that it comprises:
   a main body,
   a wall made of a plastic material that is transparent to a visible light, comprising a face visible from an outside of a vehicle, and
   a coating that is transparent to the visible light, wherein the coating covers the face visible from the outside of the vehicle of the wall that is transparent to the visible light and is visible from the outside of the vehicle,
   wherein the main body is adapted to cover all other faces of the wall, wherein the all other faces of the wall are faces of the wall apart from the face visible from the outside of the vehicle, and wherein the wall is encapsulated in a sealed manner by the main body and the coating that is transparent to the visible light.

2. The bodywork panel according to claim 1, wherein the wall transparent to the visible light is made of polyamide and the coating transparent to the visible light is a film made of polyurethane.

3. The bodywork panel according to claim 1, wherein a thickness of the coating transparent to the visible light is between 0.5 millimeters and 3 millimeters.

4. The bodywork panel according to claim 1, wherein at least one decorative element is positioned in any one of: between the wall transparent to the visible light and the main body and between the wall transparent to the visible light and the coating transparent to the visible light.

5. The bodywork panel according to claim 1, wherein at least one defrosting wire is positioned in any one of: between the wall transparent to the visible light and the main body and between the wall transparent to visible light and the coating transparent to the visible light.

6. The bodywork panel according to claim 1, wherein at least one visible light emitting device is positioned between the wall transparent to visible light and the main body or between the wall transparent to the visible light and the coating transparent to the visible light.

7. The bodywork panel according to claim 1, wherein the bodywork panel forms a bumper skin.

8. The bodywork panel according to claim 1, wherein the bodywork panel at least partially forms a radome.

9. A method for manufacturing a motor vehicle bodywork panel of claim 1, comprising: encapsulating a wall made of plastic material transparent to a visible light, wherein the wall is between a coating transparent to the visible light and a main body of the bodywork panel.

10. The method according to claim 9, comprising the following steps:
    applying the coating transparent to the visible light in a mold, and
    molding the wall transparent to the visible light on the coating-encapsulating the wall transparent to the visible light in a sealed manner between the coating transparent to the visible light and the main body of the bodywork panel.

11. The method according to claim 9, comprising the following steps:
    molding the wall transparent to the visible light,
    overmolding the coating transparent to the visible light on at least one face of the wall transparent to the visible light visible from outside a vehicle, and
    encapsulating the wall transparent to the visible light in a sealed manner between the coating transparent to the visible light and the main body of the bodywork panel.

12. The method according to claim 9, wherein at least one of: at least one decorative element, at least one defrosting wire, and at least one visible light emitting device is placed between the main body and the wall transparent to the visible light.

13. The method according to claim 9, wherein at least one of: at least one decorative element, at least one defrosting wire, and at least one device for emitting visible light is placed between the coating transparent to the visible light and the wall transparent to the visible light.

14. The method according to claim 9, wherein the wall transparent to the visible light is made of polyamide and the coating transparent to the visible light is a film made of polyurethane.

15. The method according to claim 10, wherein applying the coating in the mold is performed by spraying.

16. The method according to claim 14, wherein a thickness of the film made of polyurethane is between 0.5 millimeters and 3 millimeters.

17. A motor vehicle bodywork panel, characterized in that it comprises:
- a main body,
- a wall made of a plastic material that is transparent to a visible light, comprising a face visible from an outside of a vehicle, and
- a coating that is transparent to the visible light, wherein the coating covers the face visible from the outside of the vehicle of the wall that is transparent to the visible light and is visible from the outside of the vehicle, wherein the main body is adapted to cover all other faces of the wall, wherein the all other faces of the wall are faces of the wall apart from the face visible from the outside of the vehicle, and wherein the wall is encapsulated in a sealed manner by the main body and the coating that is transparent to the visible light only.

* * * * *